US012640578B2

(12) United States Patent
Ma et al.

(10) Patent No.: US 12,640,578 B2
(45) Date of Patent: May 26, 2026

(54) BATTERY PACK CHARGING SYSTEM AND ITS CONTROL METHOD AND APPARATUS, CONTROL UNIT, AND STORAGE MEDIUM

(71) Applicant: CONTEMPORARY AMPEREX TECHNOLOGY (HONG KONG) LIMITED, Hong Kong (CN)

(72) Inventors: Hang Ma, Ningde (CN); Xingchang Wang, Ningde (CN); Wei Tian, Ningde (CN); Fangyou Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 765 days.

(21) Appl. No.: 18/086,438

(22) Filed: Dec. 21, 2022

(65) Prior Publication Data

US 2023/0268756 A1    Aug. 24, 2023

Related U.S. Application Data

(63) Continuation of application No. PCT/CN2022/099233, filed on Jun. 16, 2022.

(30) Foreign Application Priority Data

Feb. 18, 2022    (CN) .......................... 202210151016.7

(51) Int. Cl.
*H02J 7/00*        (2026.01)
*H01M 10/46*        (2006.01)
*H02J 7/34*        (2006.01)

(52) U.S. Cl.
CPC ......... *H02J 7/00712* (2020.01); *H01M 10/46* (2013.01); *H02J 7/0048* (2020.01);
(Continued)

(58) Field of Classification Search
CPC ................................................... H02J 7/00712
(Continued)

(56) References Cited

U.S. PATENT DOCUMENTS

2008/0100265 A1    5/2008    Lim et al.
2008/0203969 A1*    8/2008    Kurihara ........... H01M 10/0525
                                                     320/145
(Continued)

FOREIGN PATENT DOCUMENTS

CN            86100510 A        8/1987
CN            101807821 A        8/2010
(Continued)

OTHER PUBLICATIONS

Ningder Age New Energy Technology Co Ltd, First Office Action, CN202210151016.7, Mar. 30, 2022, 17 pgs.
(Continued)

*Primary Examiner* — Yalkew Fantu
(74) *Attorney, Agent, or Firm* — ANOVA LAW GROUP, PLLC

(57)        ABSTRACT

The present application discloses a battery pack charging system and its control method. The battery pack charging system includes a battery pack, a charging apparatus, a negative pulse absorbing branch, and a control unit; the negative pulse absorbing branch includes a switch, a power resistor connected in series with the switch, and a supercapacitor connected in series with the power resistor; and the control method includes: monitoring an SOC value of the battery pack in a negative pulse charging process for the battery pack; when the SOC value increases by a preset value, controlling the switch to be closed so that the power resistor and the supercapacitor can absorb discharge energy of the battery pack; and after the closing time of the switch lasts for a preset duration, controlling the switch to be
(Continued)

opened so that depolarization speed in the negative pulse charging process may be increased.

16 Claims, 4 Drawing Sheets

(52) U.S. Cl.
CPC ........... *H02J 7/00711* (2020.01); *H02J 7/345* (2013.01); *H02J 2207/20* (2020.01)

(58) Field of Classification Search
USPC ......................................................... 320/129
See application file for complete search history.

(56) References Cited

U.S. PATENT DOCUMENTS

| | | | |
|---|---|---|---|
| 2010/0111706 A1 | 5/2010 | Abraham | |
| 2014/0217976 A1* | 8/2014 | McGrath ............. | B60L 15/2045 |
| | | | 320/109 |
| 2016/0204625 A1 | 7/2016 | Joseph et al. | |
| 2019/0199101 A1* | 6/2019 | Hennesy ............... | H02J 7/0031 |
| 2020/0220225 A1 | 7/2020 | Lemke et al. | |
| 2021/0384564 A1* | 12/2021 | Rogers ................ | H01M 50/204 |
| 2022/0006308 A1 | 1/2022 | Zhang et al. | |

FOREIGN PATENT DOCUMENTS

| | | | |
|---|---|---|---|
| CN | 101986455 A | 3/2011 | |
| CN | 102130449 A | 7/2011 | |
| CN | 102709974 A | 10/2012 | |
| CN | 110581572 A | 12/2019 | |
| CN | 111301173 A | 6/2020 | |
| CN | 111786447 A | 10/2020 | |
| CN | 114221422 A | 3/2022 | |
| JP | 2000106219 A | 4/2000 | |
| JP | 2008116433 A | 5/2008 | |
| JP | 2015504648 A | 2/2015 | |
| JP | 2020018085 A | 1/2020 | |
| WO | 2019130774 A1 | 7/2019 | |

OTHER PUBLICATIONS

Ningder Age New Energy Technology Co Ltd, First Search of Priority Application, CN202210151016.7, Mar. 24, 2022, 2 pg.

Ningder Age New Energy Technology Co Ltd, Supplementary Search of Priority Application, CN202210151016.7, Apr. 18, 2022, 1 pg.

Ningder Age New Energy Technology Co Ltd, Notification to Grant Patent Right for Invention, CN202210151016.7, Apr. 20, 2022, 3 pgS.

Jun Fan et al., "Principle and application of semi-conductor excitation for synchronous generator," pp. 238-239,Oct. 1, 1981, https://Img.duxiu.com/n/jpgfs/book/base/10259909/88d3daee8c717c668152927bbbee6159/c24869b2fe6975633854c6631633b926.shtml?uf=1&t . . . , 4 pgs.

The European Patent Office (EPO) Invitation pursuant to Rule 62a(1) EPC for Application No. 22783412.4 Nov. 7, 2023 3 Pages.

The World Intellectual Property Organization (WIPO) International Search Report and Written Opinion for PCT/CN2022/099233 Nov. 2, 2022 16 Pages (including translation).

The European Patent Office (EPO) The Extended European Search Report for Application No. 22783412.4 Feb. 19, 2024 5 Pages.

The Japan Patent Office (JPO) Notification of Reasons for Refusal for Application No. 2022-562137 and Translation Mar. 12, 2024 18 Pages.

\* cited by examiner

BATTERY PACK CHARGING SYSTEM AND ITS CONTROL METHOD AND APPARATUS, CONTROL UNIT, AND STORAGE MEDIUM

CROSS-REFERENCE TO RELATED APPLICATIONS

This application is a continuation application of PCT Patent Application No. PCT/CN2022/099233, entitled "BATTERY PACK CHARGING SYSTEM AND ITS CONTROL METHOD AND APPARATUS, CONTROL UNIT, AND STORAGE MEDIUM" filed on Jun. 16, 2022, which claims priority to Chinese Patent Application No. 202210151016.7, filed with the State Intellectual Property Office of the People's Republic of China on Feb. 18, 2022, and entitled "BATTERY PACK CHARGING SYSTEM AND ITS CONTROL METHOD AND APPARATUS, CONTROL UNIT, AND STORAGE MEDIUM", all of which are incorporated herein by reference in their entirety.

TECHNICAL FIELD

Examples of the present application relate to the field of charging technologies and, in particular, to a battery pack charging system and its control method and apparatus, a control unit, and a storage medium.

BACKGROUND ART

Negative pulse charging refers to that, during a charging process, a battery is intermittently pulse discharged. Negative pulse charging is widely used because of its advantages, such as effective elimination of various polarized voltages, shortening of time required for battery charging, and reduction of water loss. However, the current negative pulse charging technology suffers from the problem of slow depolarization during charging.

SUMMARY OF THE INVENTION

The objective of the examples of the present application is to provide a battery pack charging system and its control method and apparatus, a control unit, and a storage medium, so that depolarization speed in a negative pulse charging process can be increased.

In a first aspect, examples of the present application provide a battery pack charging system and its control method. The battery pack charging system includes a battery pack, a charging apparatus for charging the battery pack, a negative pulse absorbing branch connected in parallel with the battery pack, a control unit for controlling the battery pack charging system, a cooling unit connected with the control unit, and a DC/DC conversion unit. The negative pulse absorbing branch includes a switch, a power resistor connected in series with the switch, and a supercapacitor connected in series with the power resistor. The DC/DC conversion unit, the power resistor, and the supercapacitor form a closed loop, a first end of the DC/DC conversion unit is connected to the control unit, and a second end of the DC/DC conversion unit is connected to the cooling unit. The control method is applied to the control unit, including: monitoring an SOC value of the battery pack in the negative pulse charging process for the battery pack; controlling the switch to be closed every time the SOC value increases by a preset value, so that the power resistor and the supercapacitor are able to absorb discharge energy of the battery pack; and controlling the switch to be opened when the closing time of the switch lasts for a preset duration. After controlling the switch to be closed, the method further includes: controlling the DC/DC conversion unit to start, so that the started DC/DC conversion unit converts the discharge energy into a power supply voltage for the cooling unit; and controlling the cooling unit to start, so that the started cooling unit dissipates heat for the power resistor under the action of the power supply voltage.

In the technical solutions of the examples of the present application, a supercapacitor is connected in series onto a branch where a power resistor is located, and the supercapacitor is used to absorb discharge energy of a battery pack. In the negative pulse charging process for the battery pack, a switch is controlled to be closed every time an SOC value increases by a preset value, so that the power resistor and the supercapacitor are able to absorb the discharge energy of the battery pack, and the switch is controlled to be opened after the closing time of the switch lasts for a preset duration. By controlling the closing and opening of the switch, opportunities to start absorbing the discharge energy and stop absorbing the discharge energy can be effectively controlled. Since the power resistor itself can dissipate the discharge energy, the power resistor can further absorb the discharge energy in conjunction with the supercapacitor, increasing a depolarization speed in the negative pulse charging process. That is, polarization accumulation effect in the negative pulse charging process can be weakened, which is conducive to maintaining a uniform, flat and dense morphology of a negative electrode of the battery pack, suppressing the increase in impedance of the battery pack, increasing battery capacity retention rate at low temperature, enhancing cycling stability, and prolonging the service life. In turn, the charging system is enabled to provide high-power direct-current fast charging and shorter charging time without affecting the safety and life of the battery pack. after the switch is closed, a temperature of the power resistor increases due to absorbing the discharge energy of the battery pack, and heat of the power resistor is dissipated by a cooling unit, which is beneficial to improving safety of charging. By converting the discharge energy to obtain a power supply voltage suitable for powering the cooling unit, there is no need to use a specialized power supply unit for powering the cooling unit, which is conducive to increasing the utilization of energy, while increasing consumption of the discharge energy to further increase the depolarization speed in the negative pulse charging process. When the discharge energy is discharge energy absorbed by the supercapacitor, consuming the discharge energy stored in the supercapacitor in time is further facilitated, so that when the switch is closed next time, there is enough space in the supercapacitor to continue to absorb the discharge energy, increasing the depolarization speed throughout the negative pulse charging process.

In some examples, after controlling the switch to be opened, the method further includes: continuously controlling the DC/DC conversion unit to start, so that the continuously started DC/DC conversion unit continuously converts the discharge energy absorbed by the supercapacitor into a power supply voltage for the cooling unit; continuously controlling the cooling unit to start, so that the continuously started cooling unit continuously dissipates heat for the power resistor under the action of the power supply voltage; and controlling to turn off the DC/DC conversion unit and the cooling unit when it is determined that the discharge energy absorbed by the supercapacitor has been consumed.

After the switch is broken, the DC/DC conversion unit and the cooling unit are controlled to start for a period of time and continue to consume its absorbed discharge energy stored in the supercapacitor. By controlling to turn off the DC/DC conversion unit and the cooling unit when the discharge energy absorbed by the supercapacitor has been consumed, it is conducive to enabling the discharge energy stored in the supercapacitor to be completely consumed while extending the heat-dissipating duration for the power resistor. Therefore, it is ensured that each time the switch is closed throughout the charging process, the supercapacitor has sufficient space to absorb the discharge energy of the battery pack, which greatly increases the depolarization speed throughout the negative pulse charging process.

In a second aspect, examples of the present application provide a control apparatus for a battery pack charging system. The battery pack charging system includes a battery pack, a charging apparatus for charging the battery pack, a negative pulse absorbing branch connected in parallel with the battery pack, a control unit for controlling the battery pack charging system, a cooling unit connected with the control unit, and a DC/DC conversion unit. The negative pulse absorbing branch includes a switch, a power resistor connected in series with the switch, and a supercapacitor connected in series with the power resistor. The DC/DC conversion unit, the power resistor, and the supercapacitor form a closed loop, a first end of the DC/DC conversion unit is connected to the control unit, and a second end of the DC/DC conversion unit is connected to the cooling unit.

The control apparatus includes: a monitoring module for monitoring a current SOC value of the battery pack in the negative pulse charging process for the battery pack; a switch closing control module for controlling the switch to be closed every time the SOC value increases by a preset value, so that the power resistor and the supercapacitor can absorb discharge energy of the battery pack; a switch opening control module to control the switch to be opened after the closing time of the switch lasts for a preset duration; a second starting module for controlling the DC/DC conversion unit to start after the switch is controlled to be closed, so that the started DC/DC conversion unit converts the discharge energy into a power supply voltage for the cooling unit; a first starting module for controlling the cooling unit to start after the switch is controlled to be closed, so that the started cooling unit dissipates heat for the power resistor under the action of the power supply voltage.

In some examples, the control apparatus further includes: a turn-off control module. The second starting module is further used for continuously controlling the DC/DC conversion unit to start after the switch is controlled to be opened, so that the continuously started DC/DC conversion unit continuously converts the discharge energy absorbed by the supercapacitor into a power supply voltage for the cooling unit. The first starting module is further used for continuously controlling the cooling unit to start after the switch is controlled to be opened, so that the continuously started cooling unit continuously dissipates heat for the power resistor under the action of the power supply voltage. The turn-off control module is used for controlling to turn off the DC/DC conversion unit and the cooling unit when it is determined that the discharge energy absorbed by the supercapacitor has been consumed.

In a third aspect, examples of the present application further provide a battery pack charging system, including: a battery pack, a charging apparatus for charging the battery pack, a negative pulse absorbing branch connected in parallel with the battery pack, a control unit for controlling the battery pack charging system, a cooling unit connected to the control unit, and a DC/DC conversion unit. The negative pulse absorbing branch includes a switch, a power resistor connected in series with the switch, and a supercapacitor connected in series with the power resistor. The DC/DC conversion unit, the power resistor, and the supercapacitor form a closed loop, a first end of the DC/DC conversion unit is connected to the control unit, and a second end of the DC/DC conversion unit is connected to the cooling unit. The power resistor and the supercapacitor are used to absorb discharge energy of the battery pack after the switch is closed. The DC/DC conversion unit is used for converting the discharge energy into a power supply voltage for the cooling unit after started. The cooling unit is used for dissipating heat for the power resistor under the action of the power supply voltage after started.

In a fourth aspect, examples of the present application further provide a control unit, including: at least one processor; and a memory communicatively connected to the at least one processor; where the memory stores instructions executable by the at least one processor, the instructions are executed by the at least one processor to enable the at least one processor to execute the control method for the battery pack charging system according to the first aspect.

In a fifth aspect, examples of the present application further provide a computer-readable storage medium storing a computer program. The computer program, when executed by a processor, implements the control method for the battery pack charging system according to the first aspect.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, Detailed Description of the present application is exemplified below.

DESCRIPTION OF DRAWINGS

In order to illustrate the technical solutions of the examples of the present application more clearly, the drawings required in the examples of the present application will be briefly introduced below. Obviously, the drawings described below are only some examples of the present application. For those of ordinary skill in the art, other drawings can also be obtained according to the drawings without any creative effort.

DETAILED DESCRIPTION

Figure 1:
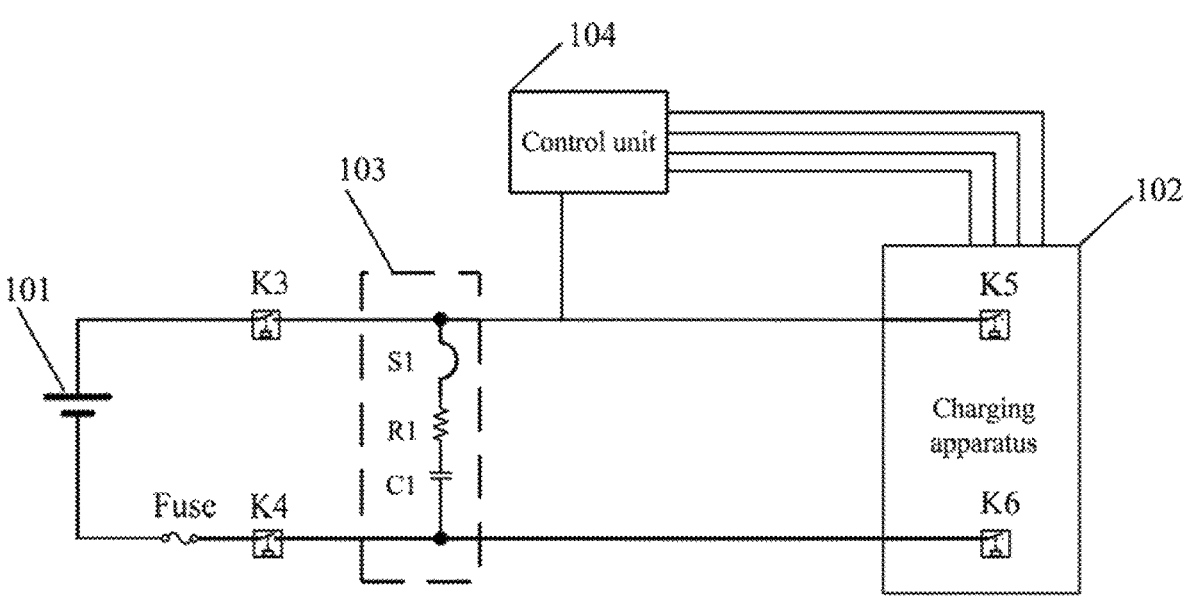
FIG. 1 is a schematic diagram of a battery pack charging system disclosed in an example of the present application.

Embodiments of the present application are described in further detail below in conjunction with the drawings and examples. The following detailed description of the examples and the drawings are used to illustrate the principles of the present application by way of example, but should not be used to limit the scope of the present application, that is, the present application is not limited to the described examples.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are used for descriptive purposes only, and cannot be construed as indicating or implying relative importance. "Vertical" is not strictly vertical, but within the allowable range of errors. "Parallel" is not strictly parallel, but within the allowable range of errors.

Orientation words appearing in the following description are all directions shown in the drawings, and do not limit the specific structure of the present application. In the description of the present application, it should also be noted that, unless otherwise expressly specified and limited, the terms "mount," "connected," and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

Reference herein to "an example" means that a particular feature, structure, or characteristic described in connection with the example can be included in at least one example of the present application. The appearance of this phrase in various places in the specification does not necessarily refer to the same example, nor is it a separate or alternative example that is mutually exclusive with other examples. It is explicitly and implicitly understood by those skilled in the art that the examples described herein may be combined with other examples.

In the description of the examples of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of power batteries, the demand of their market is also constantly expanding, followed by the development of various charging technologies for power batteries (hereinafter referred to as batteries or battery packs).

The batteries on the market are mostly rechargeable storage batteries, and the most common ones are lithium batteries, such as lithium-ion batteries or lithium ion polymer batteries, and the like. In the charging process, a battery is generally charged by means of continuous charging, and the continuous charging for the battery will cause the occurrence of lithium plating and heat generation etc. to the battery, which degrades the performance of the battery, shortens the cycle life greatly, and further limits the fast charging capacity of the battery, and it may cause catastrophic consequences such as burning and explosion, resulting in serious safety problems.

The inventors have noticed that, among various charging technologies, negative pulse charging is one of the commonly used charging technologies at present. Negative pulse charging is to pulse discharge a battery pack intermittently during charging. In a specific implementation, it usually refers to discharging a battery pack under a high current charging gap to implement fast charging for the battery pack. The high charging speed is also one of the main reasons why the negative pulse charging technology is widely used.

However, in view of the current negative pulse charging technology, the inventors found through investigation that in the negative pulse charging process and upon discharging for a battery pack, discharge energy is difficult to quickly absorb, which easily leads to untimely depolarization, that is, the depolarization speed is low. Therefore, in order to solve the problem of the low depolarization speed of the negative pulse charging process, the inventor has made deep investigation and designed a battery pack charging system and a control method therefor based on the fact that the main reason for the problem of the low depolarization speed is that the discharge energy is difficult to quickly absorb. The battery pack control system includes a power resistor and a supercapacitor. The power resistor itself can dissipate discharge energy of the battery pack and can further absorb the discharge energy of the battery pack in conjunction with the supercapacitor, that is, the combination of the power resistor and the supercapacitor can increase the rate at which the discharge energy is absorbed, thereby increasing the depolarization speed during negative pulse charging. According to the control method described above, in the negative pulse charging process for the battery pack, a switch is controlled to be closed every time an SOC value of the battery pack increases by a preset value, so that the power resistor and the supercapacitor are able to absorb the discharge energy of the battery pack, and the switch is controlled to be opened after the closing time of the switch lasts for a preset duration.

The control method for the battery pack charging system disclosed in the examples of the present application is applied to a control unit, the control unit may be a battery management system (BMS), and the BMS is a control system to protect safety of use of a power battery, which monitors the use status of the battery constantly and provides a guarantee for the safety of the use of new energy vehicles. In a specific implementation, the control unit may also be other devices capable of executing the control methods in the examples of the present application. An application scenario for this example is a scenario in which a battery pack is charged with negative pulses by a charging apparatus. In this example, negative pulse charging can be understood as the case where throughout the charging process, while the battery pack is charged with positive pulses, the battery pack is intermittently discharged with negative pulses. The battery pack may be a battery pack in a charging-demanding device, such as an electric bicycle, an electric motorcycle, and an electric vehicle, for example, the battery pack may be specifically an in-vehicle lithium battery.

It should be noted that the above-mentioned charging apparatus may charge an electrical apparatus using a battery pack as a power source. The electrical apparatus may be, but is not limited to, a mobile phone, a tablet, a laptop, an electric toy, an electric tool, a battery vehicle, an electric vehicle, a ship, a spacecraft, and so on. The charging apparatus may be a charging pile, a charger, a charging cabinet, and so on.

In some examples, reference can be made to FIG. 1 for a schematic diagram of a battery pack charging system, including: a battery pack 101, a charging apparatus 102 for charging the battery pack, a negative pulse absorbing branch 103 connected in parallel with the battery pack 101, and a control unit 104 for controlling the battery pack charging system; the negative pulse absorbing branch 103 includes a switch S1, a power resistor R1 connected in series with the switch S1, and a supercapacitor C1 connected in series with the power resistor R1. Both the charging apparatus 102 and the switch S1 are connected to the control unit 104 and controlled by the control unit 104 The power resistor R1 and the supercapacitor C1 are used to absorb discharge energy of the battery pack 101 after the switch S1 is closed. The discharge energy of the battery pack 101 is discharge energy when the battery pack 101 is intermittently discharged with negative pulses throughout the charging process.

In some examples, as shown in FIG. 1, the battery pack charging system further includes: a charging negative electrode relay K4 connected between a negative electrode of the battery pack 101 and the charging apparatus 102, a positive electrode relay K3 connected between a positive electrode of the battery pack 101 and the charging apparatus 102, and a fuse connected between the negative electrode of the battery pack 101 and the charging negative electrode relay K4. In FIG. 1, the charging apparatus 102 may also be provided with a relay K5 and a relay K6 inside. The control unit 104 can control K3, K4, K5, and K6 to be closed, so that the charging apparatus 102 starts to charge the battery pack 101.

Figure 2:
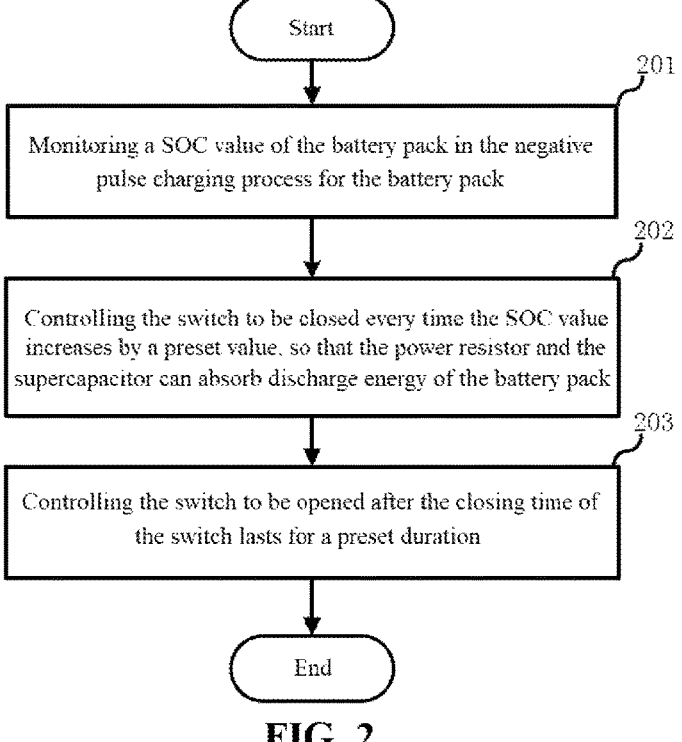
FIG. 2 is a schematic flow chart of a control method for a battery pack charging system disclosed in an example of the present application.

According to some examples of the present application, reference can be made to FIG. 2 for the schematic flowchart of the control method for the battery pack charging system, including:

step 201: monitoring a SOC value of the battery pack in the negative pulse charging process for the battery pack;

step 202: controlling the switch to be closed every time the SOC value increases by a preset value, so that the power resistor and the supercapacitor can absorb discharge energy of the battery pack; and step 203: controlling the switch to be opened after the closing time of the switch lasts for a preset duration.

In the step 201, as shown in FIG. 1, the control unit 104 may control K3, K4, K5, and K6 to be closed, so that the charging apparatus 102 starts to charge the battery pack 101 with negative pulses. In the process of negative pulse charging for the battery pack 101 by the charging apparatus 102, the control unit 104 may monitor a state of charge (SOC) value of the battery pack 101 in real time. The SOC value is a ratio of a current capacity of a battery pack to its full charge capacity, is usually expressed in percentage, and has a value range of 0 to 1. When the SOC value is 0, it means that the battery pack is fully discharged, that is, the current capacity in the battery pack is 0. When SOC=1, it means that the battery pack is fully charged, that is, the current capacity of the battery pack is its full charge capacity.

In some examples, the full charge capacity of the battery pack 101 may be a factory parameter of the battery pack 101, that is, the capacity when the battery pack 101 is fully charged can be tested before it is out of a factory. However, this example is not so specifically limited, and the full charge capacity of the battery pack 101 may also be tested according to actual needs after the battery pack 101 is out of the factory. In step 201, the control unit 104 may acquire the current capacity of the battery pack 101 in real time, and calculate according to the current capacity and its full charge capacity to obtain a current SOC value of the battery pack.

In step 202, starting with monitoring the SOC value of the battery pack, the control unit may control the switch to be closed every time monitoring SOC value increases by a preset value, so that throughout the negative pulse charging process, the switch is controlled to be closed once every time the battery pack 101 is charged to a certain level of capacity, that is, every time the SOC value increases by a preset value. The preset value may be set according to actual needs, for example, may be set to 5%, 10%, 15%, etc., which is not specifically limited in this example.

In some examples, a point of time of starting to monitor the SOC value of the battery pack may also be understood as a point of time of starting negative pulse charging, and step 202 may also be: controlling the switch to be closed from the start of negative pulse charging, whenever it is determined that the SOC value increases by a preset value.

In some examples, the SOC value monitored at the point of time of starting to monitor the SOC value of the battery pack may be understood as an SOC initial value.

Assuming that the SOC initial value is 1% and a preset value is 10%, each increase of the SOC value by a preset value may be understood as:

every time the SOC value being increased by 10%. Every time the SOC value increases by a preset value, the switch is controlled to be closed, which may be understood as: when the SOC value increasing from 1% to 11% is monitored, the switch is controlled to be closed. When the SOC value increasing from 11% to 21% is monitored, the switch is controlled to be closed. When the SOC value increasing from 21% to 31% is monitored, the switch is controlled to be closed. When the SOC value increasing from 31% to 41% is monitored, the switch is controlled to be closed. When the SOC value increasing from 41% to 51% is monitored, the switch is controlled to be closed. When the SOC value increasing from 51% to 61% is monitored, the switch is controlled to be closed. When the SOC value increasing from 61% to 71% is monitored, the switch is controlled to be closed. When the SOC value increasing from 71% to 81% is monitored, the switch is controlled to be closed. When the SOC value increases from 81% to 91% is monitored, the switch is controlled to be closed until the monitored SOC value is 100%, indicating that charging is complete.

Assuming that the SOC initial value is 5% and a preset value is 15%, each increase of the SOC value by a preset value may be understood as:

every time the SOC value being increased by 15%. Every time the SOC value increases by a preset value, the switch is controlled to be closed, which may be understood as: when the SOC value increasing from 5% to 20% is monitored, the switch is controlled to be closed. When the SOC value increasing from 20% to 35% is monitored, the switch is controlled to be closed. When the SOC value increasing from 35% to 50% is monitored, the switch is controlled to be closed. When the SOC value increasing from 50% to 65% is monitored, the switch is controlled to be closed. When the SOC value increasing from 65% to 80% is monitored, the switch is controlled to be closed. When the SOC value increasing from 80% to 95% is monitored, the switch is controlled to be closed, until the monitored SOC value is 100%, indicating that charging is complete.

In step 202, the control unit 104 controls the switch S1 to be closed, enabling the power resistor R1 and the supercapacitor C1 to absorb the discharge energy of the battery pack 101. After the switch S1 is closed, which is equivalent to a loop composed of the negative pulse absorbing branch 103, the battery pack 101, the charging positive electrode relay K3, the charging negative electrode relay K4, and the fuse is on, the power resistor R1 and the supercapacitor C1 therefore are able to absorb the discharge energy of the battery pack 101. The discharge energy can also be understood as a reverse current from negative pulse discharging of the battery pack 101.

In some examples, after the control unit 104 controls the switch S1 to be closed, charging power of the charging apparatus 102 may be set to 0, so that the charging apparatus 102 suspends charging the battery pack 101 with positive pulses while the switch S1 is closed. After the switch S1 is broken, the charging apparatus 102 may restore the charging power of the charging apparatus 102, so that the charging apparatus 102 is able to charge the battery pack 101 with positive pulses while the switch S1 is broken, thereby increasing the SOC value of the battery pack 101.

In step 203, the control unit 104 may start timing from controlling the switch S1 to be closed, and control the switch S1 to be opened after determining that a timing duration namely a closing duration reaches a preset duration, so that the loop composed of the negative pulse absorbing branch 103, the battery pack 101, the charging positive electrode relay K3, the charging negative electrode relay K4, and the fuse is off, and accordingly the power resistor R1 and the supercapacitor C1 stop absorbing the discharge energy. The preset duration may be set according to actual needs, for example, it may be: 6 seconds, 7 seconds, 8 seconds, etc. After the switch S1 is broken, the battery pack 101 stops discharging, and the charging apparatus 102 starts charging the battery pack 101. That is to say, throughout the negative pulse charging process, the battery pack 101 starts to discharge every time the switch S1 is closed, and the battery pack 101 stops discharging and the charging apparatus 102 starts charging the battery pack 101 every time the switch S1 is broken. Thus, the negative pulse charging technology of intermittently pulse discharging the battery pack during charging can be implemented.

In this example, a supercapacitor is connected in series onto a branch where a power resistor is located, and the supercapacitor is used to absorb discharge energy of a battery pack. In the negative pulse charging process for the battery pack, the switch is controlled to be closed every time an SOC value increases by a preset value, so that the power resistor and the supercapacitor are able to absorb the discharge energy of the battery pack, and the switch is controlled to be opened after the closing time of the switch lasts for a preset duration. By controlling the closing and opening of the switch, opportunities to start absorbing the discharge energy and stop absorbing the discharge energy can be effectively controlled. Since the power resistor itself can dissipate the discharge energy, the power resistor can further absorb the discharge energy in conjunction with the supercapacitor, increasing a depolarization speed in the negative pulse charging process. That is, polarization accumulation effect in the negative pulse charging process can be weakened, which is conducive to maintaining a uniform, flat and dense morphology of a negative electrode of the battery pack, suppressing the increase in impedance of the battery pack, increasing battery capacity retention rate at low temperature, enhancing cycling stability, and prolonging the service life. In turn, the charging system is enabled to provide high-power direct-current fast charging and shorter charging time without affecting the safety and life of the battery pack.

According to some examples of the present application, the battery pack charging system further includes: a cooling unit connected to the control unit. After the step 202 described above, the method further includes: controlling the cooling unit to start, so that the started cooling unit dissipates heat for the power resistor.

The cooling unit may be a module or device for cooling and dissipating heat. In this example, after the control unit controls the switch S1 to be closed, the control unit controls the cooling unit to start. After the cooling unit is started, it starts to exert its cooling function to dissipate heat for the power resistor. Optionally, the cooling unit may be positioned close to the power resistor to better dissipate heat for the power resistor.

Figure 3:
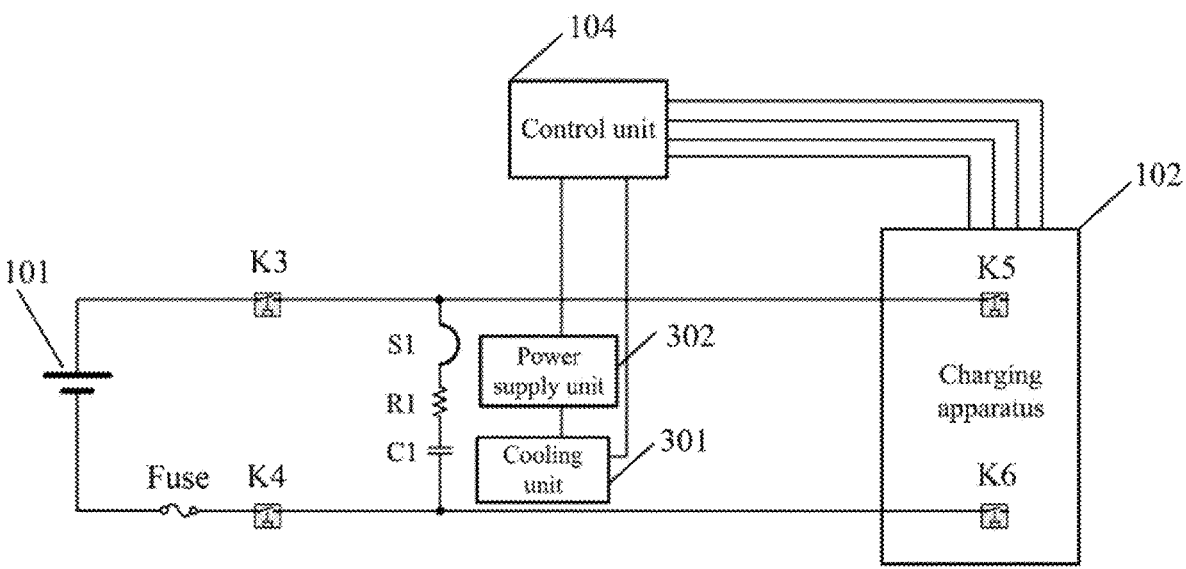
FIG. 3 is a schematic diagram of another battery pack charging system disclosed in an example of the present application.

In some examples, reference can be made to FIG. 3 for a schematic diagram of a battery pack charging system, including: a battery pack 101, a charging apparatus 102, a control unit 104, a cooling unit 301, a power supply unit 302, a switch S1, a power resistor R1, and a supercapacitor C1. A first end of the cooling unit 301 is connected to the control unit 104, so that the control unit 104 is able to control the start and stop of the cooling unit 301. A second end of the cooling unit 301 is connected to the power supply unit 302, so that the power supply unit 302 is able to supply power to the cooling unit 301 The power supply unit 302 may also be connected with the control unit 104, so that the control unit 104 may control when the power supply unit 302 starts to supply power to the cooling unit 301 and when it stops supplying power to the cooling unit 301.

In this example, in view of a negative pulse being substantially a high current, after the switch is closed, a temperature of the power resistor is likely to rise rapidly due to absorbing of the discharge energy of the battery pack. Therefore, the cooling unit dissipates heat for the power resistor, which is conducive to improving the safety of charging.

According to some examples of the present application, the battery pack charging system further includes: a DC/DC conversion unit; the DC/DC conversion unit, the power resistor and the supercapacitor form a closed loop, a first end of the DC/DC conversion unit is connected to the control unit, and a second end of the DC/DC conversion unit is connected to the cooling unit. After the step 202 described above, the method further includes: controlling the DC/DC conversion unit to start, so that the started DC/DC conversion unit converts the discharge energy into a power supply voltage for the cooling unit.

It can be understood that since the negative pulse is substantially a high current, a voltage corresponding to the discharge energy is usually relatively large, such as 400 V, while a power supply voltage required by the cooling unit is usually relatively small, such as 24 V. In order to make full use of the discharge energy of the battery pack, this example is equivalent to utilizing the DC/DC conversion unit to directly convert the discharge energy into the power supply voltage required by the cooling unit, so as to supply power to the cooling unit. That is to say, the DC/DC conversion unit can be directly used as the power supply unit of the cooling unit without using a special power supply unit for supplying power to the cooling unit.

Figure 4:
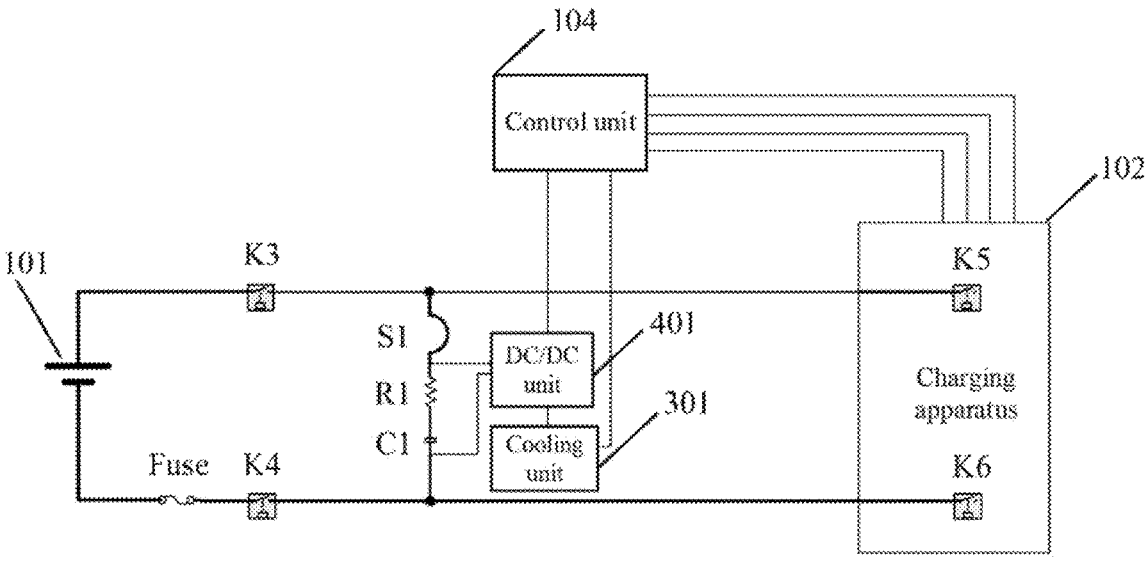
FIG. 4 is a schematic diagram of yet another battery pack charging system disclosed in an example of the present application.

In some examples, reference can be made to FIG. 4 for a schematic diagram of a battery pack charging system, including: a battery pack 101, a charging apparatus 102, a control unit 104, a cooling unit 301, a DC/DC conversion unit 401, a switch S1, a power resistor R1, and a supercapacitor C1. A first end of the DC/DC unit 401 is connected to the control unit 104, a second end of the DC/DC conversion unit 401 is connected to the cooling unit 301, and a third end of the DC/DC conversion unit 401 is connected between the power resistor R1 and the switch S1, and a fourth end of the DC/DC conversion unit 401 is connected to an end of the super capacitor C1 facing away from the power resistor R1. After the control unit 104 controls the switch S1 to be closed, it controls the DC/DC conversion unit 401 to start, so that the started DC/DC conversion unit 401 converts discharge energy into a power supply voltage for the cooling unit 301 to achieve power supply to the cooling unit 301.

In some examples, after the switch S1 is closed, the battery pack 101 starts to discharge, the supercapacitor C1 starts to absorb and store the discharge energy of the battery pack 101, and the started DC/DC conversion unit 401 may convert the discharge energy from the battery pack 101 into a power supply voltage for the cooling unit 301, so that after the switch S1 is closed, heat of the power resistor R1 is dissipated by the started cooling unit 301. After the switch S1 is broken, the battery pack 101 stops discharging, the supercapacitor C1 stops absorbing the discharge energy of the battery pack 101, and the started DC/DC conversion unit 401 may convert the discharge energy stored by the supercapacitor C1 into a power supply voltage for the cooling unit 301. Therefore, after the switch S1 is broken, the cooling unit 301 that is activated continues to dissipate heat for the power resistor R1, and the discharge energy stored by the supercapacitor C1 is consumed in time. That is to say, after the switch S1 is closed, the discharge energy converted by the started DC/DC conversion unit 401 may be discharge energy directly from the battery pack 101. After the switch S1 is broken, the discharge energy converted by the started DC/DC conversion unit 401 is the discharge energy stored in the supercapacitor C1. However, this example is not so specifically limited. after the switch S1 is closed, the discharge energy converted by the started DC/DC conversion unit 401 may also be controlled to be the discharge energy stored in the supercapacitor C1 according to actual needs. In other words, as long as the discharge energy is stored in the supercapacitor C1, the started DC/DC conversion unit 401 may convert the discharge energy stored in the supercapacitor C1 into a power supply voltage for the cooling unit 301.

In this example, by converting the discharge energy to obtain a power supply voltage suitable for powering the cooling unit, there is no need to use a specialized power supply unit for powering the cooling unit, which is conducive to increasing the utilization of energy, while increasing consumption of the discharge energy to further increase the depolarization speed in the negative pulse charging process. When the discharge energy is discharge energy absorbed by the supercapacitor, consuming the discharge energy stored in the supercapacitor in time is further facilitated, so that when the switch is closed next time, there is enough space in the supercapacitor to continue to absorb the discharge energy, increasing the depolarization speed throughout the negative pulse charging process.

In some examples, in the process of supplying power to the cooling unit through the DC/DC conversion unit 401, the supercapacitor can also serve as a support capacitor, avoiding the use of an additional support capacitor. When the supercapacitor serves as a support capacitor, it is easy to subject the power supply voltage output by the DC/DC conversion unit 401 to smooth filtering, and maintain voltage fluctuations of the power supply voltage within an allowable range.

In some examples, after the switch is broken, the DC/DC conversion unit and the cooling unit may be controlled to start for a period of time T, and a size of T may be preset according to actual needs to continuously dissipate heat for the power resistor and consume the energy stored in the supercapacitor.

According to some examples of the present application, after the switch is controlled to be opened in step 203, the method further includes: continuously controlling the DC/DC conversion unit to start, so that the continuously started DC/DC conversion unit continuously converts discharge energy absorbed by the supercapacitor into a power supply voltage for the cooling unit. The start of the cooling unit is continuously controlled, so that the cooling unit that is continuously started continuously dissipates heat for the power resistor under the action of the power supply voltage. When it is determined that the discharge energy absorbed by the supercapacitor has been consumed, the DC/DC conversion unit and the cooling unit are controlled to be turned off.

Referring to FIG. 4, after the control unit 104 controls the switch S1 to be opened, it continuously controls start of the DC/DC conversion unit 401 and the cooling unit 301, so that the continuously started DC/DC conversion unit 401 continuously converts discharge energy absorbed by the supercapacitor C1 into a power supply voltage for the cooling unit 401, and that the continuously started cooling unit 401 continuously dissipates heat for the power resistor R1 under the action of the power supply voltage obtained by the continuous conversion of the DC/DC conversion unit 401. That is to say, after the switch S1 is controlled to be opened, in view of the power resistor R1 still having afterheat, the supercapacitor C1 may also have absorbed discharge energy stored. Therefore, by controlling the DC/DC conversion unit 401 and the cooling unit 301 to start for a period of time, heat is continuously dissipated for the power resistor R, and the discharge energy stored in the supercapacitor C1 is continuously consumed. The control unit 104 may acquire remaining discharge energy in the supercapacitor C1 in real time. When the control unit 104 determines that the remaining discharge energy in the supercapacitor C1 is 0, that is, when the discharge energy absorbed by the supercapacitor C1 has been consumed, it controls to turn off the DC/DC conversion unit 401 and cooling unit 301. That is to say, in this example, after the switch S1 is broken, the control unit 104 controls the DC/DC conversion unit 401 and the cooling unit 301 to start for a next period of time T, and a size of T is adaptively determined according to a time for which the discharge energy stored in the supercapacitor C1 has been consumed.

In this example, after the switch is broken, the DC/DC conversion unit and the cooling unit are controlled to start for a period of time and continue to consume its absorbed discharge energy stored in the supercapacitor. By controlling to turn off the DC/DC conversion unit and the cooling unit when the discharge energy absorbed by the supercapacitor has been consumed, it is conducive to enabling the discharge energy stored in the supercapacitor to be completely consumed while extending the heat-dissipating duration for the power resistor. Therefore, it is ensured that each time the switch is closed throughout the charging process, the supercapacitor has sufficient space to absorb the discharge energy of the battery pack, which greatly increases the depolarization speed throughout the negative pulse charging process.

Figure 5:
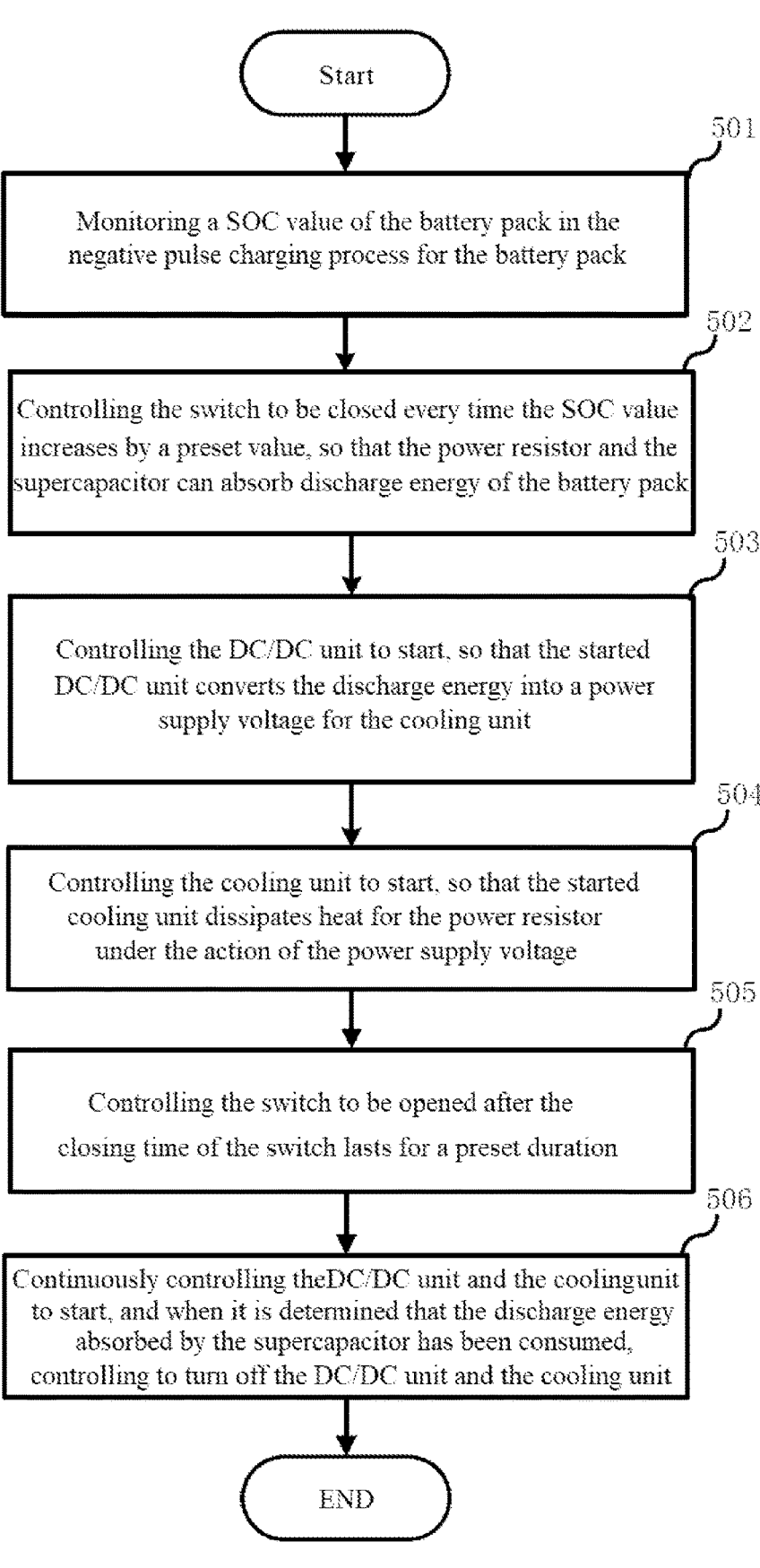
FIG. 5 is a schematic flow chart of a control method for another battery pack charging system disclosed in an example of the present application.

According to some examples of the present application, reference can be made to FIG. 5 for a flow chart of a control method for a battery pack charging system in conjunction with the schematic diagram of the battery pack charging system of FIG. 4, the method including:

step 501: monitoring a SOC value of the battery pack in the negative pulse charging process for the battery pack;

step 502: controlling the switch to be closed every time the SOC value increases by a preset value, so that the power resistor and the supercapacitor can absorb discharge energy of the battery pack;

step 503: controlling the DC/DC conversion unit to start, so that the started DC/DC conversion unit converts the discharge energy into a power supply voltage for the cooling unit;

step 504: controlling the cooling unit to start, so that the started cooling unit dissipates heat for the power resistor under the action of the power supply voltage;

step 505: controlling the switch to be opened after the closing time of the switch lasts for a preset duration; and step 506: continuously controlling the DC/DC conversion unit and the cooling unit to start, and when it is determined that the discharge energy absorbed by the supercapacitor has been consumed, controlling to turn off the DC/DC conversion unit and the cooling unit.

In this example, by controlling the closing and opening of the switch, opportunities to start absorbing the discharge energy and stop absorbing the discharge energy can be effectively controlled. Since the power resistor itself can dissipate the discharge energy, the power resistor can further absorb the discharge energy in conjunction with the supercapacitor, increasing a depolarization speed in the negative pulse charging process. That is, polarization accumulation effect in the negative pulse charging process can be weakened, which is conducive to maintaining a uniform, flat and dense morphology of a negative electrode of the battery pack, suppressing the increase in impedance of the battery pack, increasing battery capacity retention rate at low temperature, enhancing cycling stability, and prolonging the service life. In turn, the charging system is enabled to provide high-power direct-current fast charging and shorter charging time without affecting the safety and life of the battery pack. It is also possible to implement the short-term negative pulse charging function, while eliminating the risk that charging a battery pack with continuous high current will cause lithium plating to the battery pack. Heat of the power resistor is dissipated by the cooling unit, which is beneficial to improving the safety of charging. By converting the discharge energy to obtain a power supply voltage suitable for powering the cooling unit, there is no need to use a specialized power supply unit for powering the cooling unit, which is conducive to increasing the utilization of energy, while increasing consumption of the discharge energy to further increase the depolarization speed in the negative pulse charging process. When the discharge energy is discharge energy absorbed by the supercapacitor, consuming the discharge energy stored in the supercapacitor in time is further facilitated, so that when the switch is closed next time, there is enough space in the supercapacitor to continue to absorb the discharge energy. After the switch is broken, the DC/DC conversion unit and the cooling unit are controlled to start for a period of time and continue to consume its absorbed discharge energy stored in the supercapacitor. By controlling to turn off the DC/DC conversion unit and the cooling unit when the discharge energy absorbed by the supercapacitor has been consumed, it is conducive to enabling the discharge energy stored in the supercapacitor to be completely consumed while extending the heat-dissipating duration for the power resistor. Therefore, it is ensured that each time the switch is closed throughout the charging process, the supercapacitor has sufficient space to absorb the discharge energy of the battery pack, which greatly increases the depolarization speed throughout the negative pulse charging process.

It should be noted that the negative pulse absorbing branches in the battery pack charging systems shown in FIG. 1, FIG. 3, and FIG. 4 are all set outside the charging apparatus. However, in a specific implementation, the negative pulse absorbing branch may also be set inside the charging apparatus. This example does not specifically limit the setting position of the negative pulse absorbing branch.

The steps of the above various methods are divided only for the purpose of descriptive clarity, and the steps may be combined into one step or some of the steps may be split into a plurality of steps during implementation. As long as a same logical relationship is included, all cases are within the protection scope of this patent. Adding insignificant modifications or introducing insignificant designs to an algorithm or flow without changing core designs of the patent's algorithm and flow is within its protection scope.

According to some examples of the present application, a control apparatus for a battery pack charging system is involved. The battery pack charging system includes a battery pack, a charging apparatus for charging the battery pack, a negative pulse absorbing branch connected in parallel with the battery pack, and a control unit for controlling the battery pack charging system. The negative pulse absorbing branch includes a switch, a power resistor connected in series with the switch, and a supercapacitor connected in series with the power resistor. Reference can be made to FIGS. 1, 3 and 4 for a schematic diagram of the battery pack charging system, which will not be described here again to avoid repetition.

Figure 6:
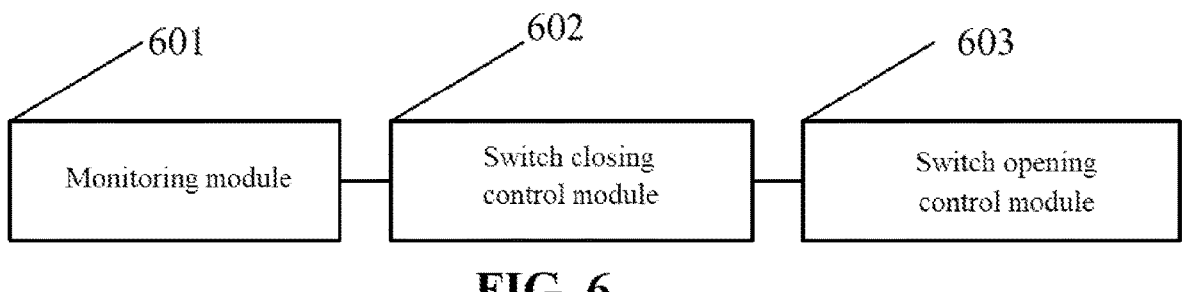
FIG. 6 is a schematic diagram of a control apparatus for a battery pack charging system disclosed in an example of the present application.

In some examples, reference can be made to FIG. 6 for a schematic diagram of the control apparatus, including: a monitoring module 601 for monitoring a current state of charge SOC value of a battery pack in the process of negative pulse charging for the battery pack; a switch closing control module 602 for controlling the switch to be closed every time the SOC value increases by a preset value, so that the power resistor and the supercapacitor can absorb discharge energy of the battery pack; and a switch opening control module 603 for controlling the switch to be opened after the closing time of the switch lasts for a preset duration.

In some examples, the battery pack charging system further includes: a cooling unit connected to the control unit. The control apparatus further includes: a first starting module; the first starting module is used to control the cooling unit to start after controlling the switch to be closed, so that the started cooling unit dissipates heat for the power resistor.

In some examples, the battery pack charging system further includes: a DC/DC conversion unit. The DC/DC conversion unit, the power resistor, and the supercapacitor form a closed loop, a first end of the DC/DC conversion unit is connected to the control unit, and a second end of the DC/DC conversion unit is connected to the cooling unit. The control apparatus further includes: a second starting module; the second starting module is used to control the DC/DC conversion unit to start after controlling the switch to be closed, so that the started DC/DC conversion unit converts discharge energy into a power supply voltage for the cooling unit, and that the cooling unit may dissipate heat for the power resistor under the action of the power supply voltage.

In some examples, the control apparatus further includes: a turn-off control module. The second starting module is further used to continuously control the DC/DC conversion unit to start after the switch is controlled to be opened, so that the continuously started DC/DC conversion unit continuously converts discharge energy absorbed by the supercapacitor into a power supply voltage for the cooling unit. The first starting module is further used to continuously control the cooling unit to start after the switch is controlled to be opened, so that the cooling unit that is continuously started continuously dissipates heat for the power resistor under the action of the power supply voltage. The turn-off control module is used to control the DC/DC conversion unit and the cooling unit to be turned off when it is determined that the discharge energy absorbed by the supercapacitor has been consumed.

It is not difficult to find that the example of the control apparatus corresponds to the example of the above-mentioned control method. The relevant technical details and technical effects mentioned in the example of the above-mentioned control method are still effective, and they will not be repeated here in order to reduce repetitions. Correspondingly, the relevant technical details and technical effects mentioned in the example of the control apparatus can also be applied to the example of the above-mentioned control method.

It is worth mentioning that each module involved in this example is a logic module. In practical applications, one logic module may be one physical unit or a part of one physical unit, or may be implemented with a combination of multiple physical units. In addition, in order to highlight the innovative part of the present invention, this embodiment does not introduce modules that are not closely related to solving the technical problem proposed by the present invention, but this does not mean that there are no other modules in this embodiment.

According to some examples of the present application, a battery pack charging system is involved, including a battery pack, a charging apparatus for charging the battery pack, a negative pulse absorbing branch connected in parallel with the battery pack, and a control unit for controlling the battery pack charging system. The negative pulse absorbing branch includes a switch, a power resistor connected in series with the switch, and a supercapacitor connected in series with the power resistor. The power resistor and the supercapacitor are used to absorb discharge energy of the battery pack after the switch is closed. In this example, reference can be made to above FIG. 1 for a schematic diagram of the battery pack charging system.

In some examples, the battery pack charging system further includes: a cooling unit connected to the control unit. The cooling unit is used to dissipate heat for a power resistor after started. In this example, reference can be made to above FIG. 3 for a schematic diagram of the battery pack charging system.

In some examples, the battery pack charging system further includes: a DC/DC conversion unit. The DC/DC conversion unit, the power resistor, and the supercapacitor form a closed loop, a first end of the DC/DC conversion unit is connected to the control unit, and a second end of the DC/DC conversion unit is connected to the cooling unit. The DC/DC conversion unit is used to convert discharge energy into a power supply voltage for the cooling unit after started. In this example, reference can be made to above FIG. 4 for a schematic diagram of the battery pack charging system.

It is not difficult to find that the example of the battery pack charging system and the example of the above-mentioned control method are used in cooperation with each other. The relevant technical details and technical effects regarding the battery pack charging system that are mentioned in the example of the above-mentioned control method are still effective, and they will not be repeated here in order to reduce repetitions. Correspondingly, the relevant technical details and technical effects mentioned in the example of the battery pack charging system can also be applied to the example of the above-mentioned control method.

Figure 7:
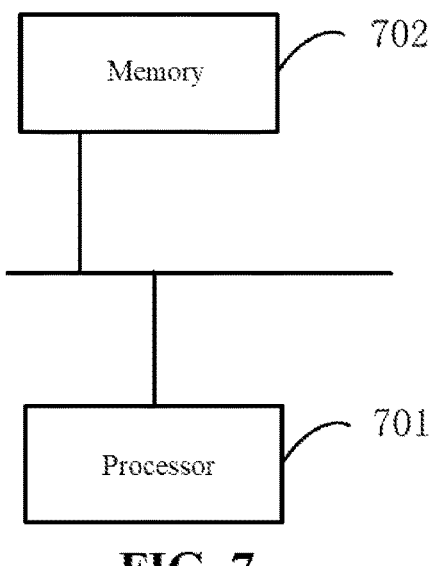
FIG. 7 is a schematic structural diagram of a control unit disclosed in an example of the present application.

According to some examples of the present application, a control unit is involved. Referring to FIG. 7, the control unit includes: at least one processor 701; and a memory 702 communicatively connected to the at least one processor 701; where the memory 702 stores instructions executable by the at least one processor 701, the instructions are executed by the at least one processor 701 to enable the at least one processor 701 to execute the control method for the battery pack charging system in the above-mentioned method examples.

The memory 702 and the processor 701 are connected by means of a bus, and the bus may include any number of interconnected buses and bridges, and the bus connects one or more processors 701 and various circuits of the memory 702 together. The bus may also connect together various other circuits, such as peripherals, voltage regulators, and power management circuits, all of which are well known in the art and therefore will not be described further herein. A bus interface provides an interface between the bus and a transceiver. The transceiver may be a single element or multiple elements, such as multiple receivers and transmitters, providing a unit for communicating with various other apparatuses over a transmission medium. Data processed via the processor 701 is transmitted on a wireless medium over an antenna, and further, the antenna also receives the data and transmits the data to the processor 701.

The processor 701 is responsible for bus managing and general processing, and may also provide various functions including timing, peripheral interface, voltage regulation, power management, and other control functions. The memory 702 may be used to store data used by the processor 701 when performing operations.

Some examples of the present application relate to a computer-readable storage medium storing a computer program. The computer program implements the above-mentioned method examples when executed by the processor.

That is, those skilled in the art could understand that implementing all or part of the steps in the above-mentioned example methods may be achieved by a program instructing relevant hardware, and the program is stored in one storage medium and includes several instructions to enable one device (which may be a single chip microcomputer, a chip, etc.) or a processor to execute all or part of the steps of the methods described in the various examples of the present application. The aforementioned storage medium includes: a USB flash drive, a portable hard disk, a Read-Only Memory (ROM), a Random Access Memory (RAM), a magnetic disk or optical disk and other media that can store program codes.

Finally, it should be noted that the above examples are merely used for illustrating rather than limiting the technical solutions of the present application. Although the present application has been described in detail with reference to the above various examples, those of ordinary skill in the art should understand that the technical solutions specified in the above various examples can still be modified, or some or all of the technical features therein can be equivalently substituted; and such modifications or substitutions do not make the essence of the corresponding technical solutions depart from the scope of the technical solutions of the various examples of the present application, which shall fall within the scope of the claims and the specification of the present application. In particular, the technical features mentioned in the various examples can be combined in any manner as long as there is no structural conflict. The present application is not limited to the specific examples disclosed herein, but rather includes all technical solutions falling within the scope of the claims.

What is claimed is:

1. A method for controlling a battery pack charging system, wherein the control method is applied to a control unit in the battery pack charging system, and the control method comprises:
monitoring a SOC value of the battery pack in a negative pulse charging process for the battery pack;
controlling a switch in the battery pack charging system to be closed every time the SOC value increases by a preset value; and
controlling the switch to be opened after the closing time of the switch lasts for a preset duration;
wherein the battery pack charging system comprises the battery pack, a charging apparatus for charging the battery pack, a negative pulse absorbing branch connected in parallel with the battery pack, a control unit for controlling the battery pack charging system, a cooling unit connected with the control unit, and a DC/DC conversion unit; the negative pulse absorbing branch includes a switch, a power resistor connected in series with the switch, and a supercapacitor connected in series with the power resistor; the DC/DC conversion unit, the power resistor, and the supercapacitor form a closed loop, a first end of the DC/DC conversion unit is connected to the control unit, and a second end of the DC/DC conversion unit is connected to the cooling unit.

2. The control method for a battery pack charging system according to claim 1, wherein after the controlling the switch to be closed, the method further comprises:
controlling the DC/DC conversion unit in the battery pack charging system to start, so that the started DC/DC conversion unit in the battery pack charging system converts discharge energy into a power supply voltage for the cooling unit in the battery pack charging system.

3. The control method for a battery pack charging system according to claim 1, wherein after the controlling the switch to be closed, the method further comprises:
controlling the cooling unit in the battery pack charging system to start, so that the started cooling unit dissipates heat for the power resistor in the battery pack charging system under the action of a power supply voltage.

4. The control method for a battery pack charging system according to claim 1, wherein after the controlling the switch to be opened, the method further comprises:
continuously controlling the DC/DC conversion unit in the battery pack charging system to start, so that the continuously started DC/DC conversion unit continuously converts discharge energy absorbed by the supercapacitor in the battery pack charging system into a power supply voltage for the cooling unit in the battery pack charging system;
continuously controlling the cooling unit to start, so that the continuously started cooling unit continuously dissipates heat for the power resistor in the battery pack charging system under the action of the power supply voltage; and
when it is determined that the discharge energy absorbed by the supercapacitor has been consumed, controlling to turn off the DC/DC conversion unit and the cooling unit.

5. The control method for a battery pack charging system according to claim 1, wherein the monitoring a SOC value of the battery pack comprises: acquiring a current capacity of the battery pack, and calculating according to the current capacity and its full charge capacity to obtain a current SOC value of the battery pack.

6. The control method for a battery pack charging system according to claim 1, wherein after controlling the switch to be closed, the method further comprises:
setting a charging power of the charging apparatus in the battery pack charging system to 0, so that charging the battery pack with positive pulses is suspended while the switch is closed.

7. A control unit, comprising:
at least one processor; and
a memory communicatively connected to the at least one processor; wherein
the memory stores instructions executable by the at least one processor, the instructions are executed by the at least one processor to enable the control unit to execute the method for controlling the battery pack charging system according to claim 1.

8. A non-transitory computer-readable storage medium storing a computer program, wherein the computer program, when executed by a processor of a control unit, implements the control method for the battery pack charging system according to claim 1.

9. An apparatus for controlling a battery pack charging system, wherein the apparatus is arranged in the battery pack charging system; and the apparatus comprises:
a monitoring module for monitoring an SOC value of the battery pack in a negative pulse charging process for the battery pack;
a switch closing control module for controlling a switch in the battery pack charging system to be closed every time the SOC value increases by a preset value;
a switch opening control module for controlling the switch to be opened after the closing time of the switch lasts for a preset duration;

a first starting module for continuously controlling a cooling unit in the battery pack charging system to start after the switch is controlled to be opened, so that the continuously started cooling unit continuously dissipates heat for a power resistor in the battery pack charging system under the action of a power supply voltage for the cooling unit;

a second starting module for continuously controlling a DC/DC conversion unit to start after the switch is controlled to be opened, so that the continuously started DC/DC conversion unit in the battery pack charging system converts discharge energy absorbed by a supercapacitor in the battery pack charging system into the power supply voltage for the cooling unit; and a turn-off control module for controlling the DC/DC conversion unit and the cooling unit to be turned off when it is determined that the discharge energy absorbed by the supercapacitor has been consumed.

10. The apparatus according to claim 9, wherein:

the second starting module is further used for controlling the DC/DC conversion unit in the battery pack charging system to start after the switch is controlled to be closed, so that the started DC/DC conversion unit converts discharge energy into the power supply voltage for the cooling unit in the battery pack charging system.

11. The apparatus according to claim 9, wherein:

the first starting module is further used for controlling the cooling unit in the battery pack charging system to start after the switch is controlled to be closed, so that the started cooling unit dissipates heat for the power resistor in the battery pack charging system under the action of the power supply voltage in the battery pack charging system.

12. The apparatus according to claim 9, wherein the monitoring module is specifically used to:

acquire a current capacity of the battery pack, and calculate according to the current capacity and its full charge capacity to obtain a current SOC value of the battery pack.

13. The apparatus according to claim 9, wherein the apparatus further comprises:

a power setting module for setting a charging power of a charging apparatus in the battery pack charging system to 0, so that charging the battery pack with positive pulses is suspended while the switch is closed.

14. The apparatus according to claim 9, wherein the battery pack charging system comprises the battery pack, a charging apparatus for charging the battery pack, a negative pulse absorbing branch connected in parallel with the battery pack, a control unit for controlling the battery pack charging system, the cooling unit connected with the control unit, and the DC/DC conversion unit; the negative pulse absorbing branch includes the switch, the power resistor connected in series with the switch, and the supercapacitor connected in series with the power resistor; the DC/DC conversion unit, the power resistor, and the supercapacitor form a closed loop, a first end of the DC/DC conversion unit is connected to the control unit, and a second end of the DC/DC conversion unit is connected to the cooling unit.

15. A battery pack charging system, comprising:

a battery pack, a charging apparatus for charging the battery pack, a negative pulse absorbing branch connected in parallel with the battery pack, a control unit for controlling the battery pack charging system, a cooling unit connected with the control unit, and a DC/DC conversion unit; the negative pulse absorbing branch includes a switch, a power resistor connected in series with the switch, and a supercapacitor connected in series with the power resistor; the DC/DC conversion unit, the power resistor, and the supercapacitor form a closed loop, a first end of the DC/DC conversion unit is connected to the control unit, and a second end of the DC/DC conversion unit is connected to the cooling unit;

a first starting module for continuously controlling the cooling unit to start after the switch is controlled to be opened, so that the continuously started cooling unit continuously dissipates heat for the power resistor under the action of a power supply voltage for the cooling unit;

a second starting module for continuously controlling the DC/DC conversion unit to start after the switch is controlled to be opened, so that the continuously started DC/DC conversion unit converts discharge energy absorbed by the supercapacitor into the power supply voltage for the cooling unit; and a turn-off control module for controlling the DC/DC conversion unit and the cooling unit to be turned off when it is determined that the discharge energy absorbed by the supercapacitor has been consumed.

16. The battery pack charging system according to claim 15, wherein the power resistor and the supercapacitor are used to absorb discharge energy of the battery pack after the switch is closed;

the DC/DC conversion unit is used to convert the discharge energy into a power supply voltage for the cooling unit after started; and the cooling unit is used to dissipate heat for the power resistor under the action of the power supply voltage after started.

* * * * *